(12) United States Patent
Kurz (10) Patent No.: US 11,335,923 B2
(45) Date of Patent: May 17, 2022

(54) SIDE-CHANNEL COMPRESSOR FOR A FUEL CELL SYSTEM FOR CONVEYING AND/OR COMPRESSING A GASEOUS MEDIUM

(71) Applicant: Robert Bosch GmbH, Stuttgart (DE)

(72) Inventor: Michael Kurz, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 16/764,052

(22) PCT Filed: Sep. 24, 2018

(86) PCT No.: PCT/EP2018/075777
§ 371 (c)(1),
(2) Date: May 14, 2020

(87) PCT Pub. No.: WO2019/096471
PCT Pub. Date: May 23, 2019

(65) Prior Publication Data
US 2020/0343566 A1    Oct. 29, 2020

(30) Foreign Application Priority Data
Nov. 17, 2017  (DE) .................... 10 2017 220 623.3

(51) Int. Cl.
*F04D 29/08* (2006.01)
*H01M 8/04089* (2016.01)
(Continued)

(52) U.S. Cl.
CPC ........ *H01M 8/04089* (2013.01); *F04D 5/002* (2013.01); *F04D 5/007* (2013.01);
(Continued)

(58) Field of Classification Search
CPC .... F04D 29/083; F04D 29/188; F04D 23/088; F04D 5/002; F04D 5/007; F04D 5/008;
(Continued)

(56) References Cited

U.S. PATENT DOCUMENTS

2010/0221097 A1*  9/2010  Dittmar ................ F04D 29/284
                                                         415/71
2011/0052378 A1    3/2011  Dittmar et al.
2020/0309137 A1*  10/2020  Kuriger ................ F04D 23/008

FOREIGN PATENT DOCUMENTS

CN     107002694 A    8/2017
DE        733758      4/1943
(Continued)

OTHER PUBLICATIONS

International Search Report for Application No. PCT/EP2018/075777 dated Dec. 11, 2018 (English Translation, 3 pages).

*Primary Examiner* — Courtney D Heinle
*Assistant Examiner* — Andrew J Marien
(74) *Attorney, Agent, or Firm* — Michael Best & Friedrich LLP (57) ABSTRACT

A side-channel compressor (1) for a fuel cell system (37) for conveying and/or compressing a gas, in particular hydrogen, having a housing (3), having a compressor chamber (30) which is situated in the housing (3) and which has two encircling side channels (19, 21), having a compressor impeller (2) which is situated in the housing (3) and which is arranged so as to be rotatable about an axis of rotation (4), wherein the compressor impeller (2) has conveying cells (28) arranged at the circumference thereof and in the region of the compressor chamber (30), and having in each case one gas inlet opening (14) formed on the housing (3) and one gas outlet opening (16), which openings are fluidically connected to one another via the compressor chamber (30), in particular the two side channels (19, 21), and wherein, in the
(Continued)

region of the compressor chamber (30), an encapsulation of the respective side channel (19, 21) is realized by at least one separation region (35) by means of a surface pairing of the compressor wheel (2) and of the housing (3). According to the invention, here, the at least one separation region (35) is formed by a surface pairing of the components compressor impeller (2) and housing (3) such that the respective one component has encircling edges (5), in particular with encircling tips (11), and the respective other component has an encircling, at least approximately planar counterpart surface (23).

13 Claims, 4 Drawing Sheets

(51) Int. Cl.

| | | |
|---|---|---|
| *H01M 8/026* | (2016.01) | |
| *H01M 8/04746* | (2016.01) | |
| *F04D 29/42* | (2006.01) | |
| *F04D 23/00* | (2006.01) | |
| *F04D 29/18* | (2006.01) | |
| *F04D 5/00* | (2006.01) | |
| *F04D 29/26* | (2006.01) | |
| *F04D 29/70* | (2006.01) | |

(52) U.S. Cl.
CPC ............ *F04D 5/008* (2013.01); *F04D 23/008* (2013.01); *F04D 29/08* (2013.01); *F04D 29/083* (2013.01); *F04D 29/086* (2013.01); *F04D 29/188* (2013.01); *F04D 29/26* (2013.01); *F04D 29/42* (2013.01); *F04D 29/701* (2013.01); *F04D 29/706* (2013.01); *H01M 8/026* (2013.01); *H01M 8/04776* (2013.01); *H01M 2250/20* (2013.01)

(58) Field of Classification Search
CPC ...... F04D 29/086; F04D 29/26; F04D 29/706; F04D 29/701
See application file for complete search history.

(56) References Cited

FOREIGN PATENT DOCUMENTS

| | | | | |
|---|---|---|---|---|
| DE | 804394 | | 4/1951 | |
| DE | 2239023 | | 2/1973 | |
| DE | 3029507 | | 3/1982 | |
| DE | 3042840 | | 5/1982 | |
| DE | 4113394 | | 11/1991 | |
| DE | 733758 | * | 1/1994 | |
| DE | 19921765 | | 11/2000 | |
| DE | 102007046014 | * | 2/2009 | ............ F04D 29/16 |
| DE | 102007046014 | | 4/2009 | |
| DE | 102007053016 | | 5/2009 | |
| DE | 102015000264 | | 7/2016 | |
| FR | 2664333 | | 1/1992 | |
| FR | 26664333 | * | 1/1992 | ............ F04D 19/02 |
| GB | 1402713 | | 8/1975 | |
| JP | 0481595 | | 3/1992 | |

* cited by examiner

SIDE-CHANNEL COMPRESSOR FOR A FUEL CELL SYSTEM FOR CONVEYING AND/OR COMPRESSING A GASEOUS MEDIUM

BACKGROUND OF THE INVENTION

The present invention relates to a side-channel compressor for a fuel cell system for conveying and/or compressing a gaseous medium, in particular hydrogen, which is provided in particular for use in vehicles with a fuel cell drive.

In the automotive sector, aside from liquid fuels, gaseous fuels will also play an increasing role in future. In particular in the case of vehicles with a fuel cell drive, it is necessary for hydrogen gas flows to be controlled. The gas flows are in this case no longer controlled in discontinuous fashion, such as is the case with the injection of liquid fuel, but the gas is extracted from at least one high-pressure tank and conducted via a feed flow line of a medium-pressure line system to an ejector unit. Said ejector unit conducts the gas via a connecting line of a low-pressure line system to a fuel cell. After the gas has flowed through the fuel cell, it is conducted via a recirculation line back to the ejector unit. Here, the side-channel compressor may be connected in between, which side-channel compressor assists the gas recirculation in terms of flow and in terms of efficiency. Furthermore, side-channel compressors are used for assisting the build-up of flow in the fuel cell drive, in particular during a (cold) start of the vehicle after a certain period of time in a shut-down state. These side-channel compressors are commonly driven by means of electric motors which, when operated in vehicles, are supplied with voltage by means of the vehicle battery.

DE 10 2007 053 016 A1 has disclosed a side-channel compressor for a fuel cell system, in the case of which a gaseous medium, in particular hydrogen, is conveyed and/or compressed. The side-channel compressor has a compressor impeller which revolves in a housing and which is fastened to a drive shaft and which is set in rotation by a drive and which is thus arranged so as to be rotatable about an axis of rotation. Furthermore, the side-channel compressor has a compressor chamber which is situated in the housing and which has at least one encircling side channel. Here, the compressor impeller has conveying cells arranged at its circumference in the region of the compressor chamber. Furthermore, in the housing, there are arranged in each case one gas inlet opening and one gas outlet opening, which are fluidically connected to one another via the at least one side channel. Here, in the region of the compressor chamber, an encapsulation of the at least one side channel is effected by at least one separation region by means of a surface pairing of the compressor impeller and of the housing.

The side-channel compressor known from DE 10 2007 053 016 A1 may have certain disadvantages. In the case of the side-channel compressor being used, in particular as a recirculation blower, in the fuel cell system, liquid water may form in an interior space of the side-channel compressor, in particular as a result of condensation from the gaseous medium. In the deactivated state of the fuel cell system in the vehicle, said water, in the presence of low ambient temperatures, settles on the pipework of the system but also on the rotating parts of the side-channel compressor such as bearings, shaft or compressor impeller. Upon starting of the vehicle and thus of the fuel cell arrangement, this may, in the case of excessive ice bridge formation, lead to blocking of the drive, as a result of which the rotating parts, in particular the compressor impeller, can be damaged, and/or starting of the system is impeded or delayed or prevented entirely.

DE 10 2015 00 264 A1 describes a side-channel compressor which, by means of a shaping and arrangement of the flow housing cover below the impeller in a direction of action of gravitational force, prevents contact of liquid water and/or the formation of ice bridges on the moving components. However, the side-channel compressor described in DE 10 2015 00 264 A1 may have certain disadvantages. The installation position of the side-channel compressor in the fuel cell system and/or in the vehicle is for example not variable owing to the structural design of the side-channel compressor, in particular owing to the flow housing cover arranged geodetically below the impeller. If a very specific installation position of the side-channel compressor in the vehicle and/or inclination angle of the vehicle is not maintained, for example owing to structural space restrictions of the vehicle manufacturer and/or a vehicle parked on an inclined road, reliable prevention of ice bridge formation between the components cannot be realized because, owing to the tilting, liquid water collected between the compressor impeller and housing. This is because the side-channel compressor described in DE 10 2015 00 264 A1 utilizes the effect of gravitational force in order to discharge the liquid water. Furthermore, in the case of an incomplete discharge of the liquid water into the region of the intermediate space, ice bridge formation may occur between the impeller and the housing.

SUMMARY OF THE INVENTION

According to the invention, a side-channel compressor is designed such that the at least one separation region is formed by a surface pairing of a compressor impeller and a housing in such a way that the in each case one component has encircling edges, in particular with encircling tips, and the respective other component has an encircling, at least approximately planar counterpart surface. In this way, owing to the geometrical shaping of the surface pairings, it is possible to prevent liquid water from being able to collect between the compressor impeller and the housing, in particular in the separation region, whereby it is ensured that, in the presence of low temperatures, no ice bridges can form in the separation region. Here, an accumulation of liquid water in the separation region is prevented by the encircling tips such that the effect of the surface tension of the liquid water is utilized. In this way, the side-channel compressor can start without problems even in the presence of low temperatures, in particular outside temperatures of below 0° C., and in the case of long periods in a shut-down state. The installation position and/or position of the side-channel compressor in a fuel cell system and/or vehicle is in this case flexible in a broad range, because the gravitational-force-induced effect for discharging the water can take effect in a large angle range, and the primary effect for discharging the water arises from the geometrical design and/or centrifugal forces. Furthermore, damage to the rotating parts of the side-channel compressor and/or of a drive, in particular of an electric drive, owing to ice bridge formation and/or an ingress of liquid water can be prevented. Furthermore, blocking of the compressor impeller in the event of a cold start owing to ice bridges can be prevented, whereby the embodiment according to the invention yields the advantageous function of protecting the compressor impeller against freezing. This leads to improved cold start capability and greater reliability of the side-channel compressor in the fuel cell system and/or in the vehicle.

Advantageous refinements of the side-channel compressor according to the invention are possible by means of the measures specified in the subclaims. The subclaims relate to preferred refinements of the invention.

In a particularly advantageous embodiment, the at least one separation region encapsulates the side channels from one another and/or encapsulates the respective side channel from a region, situated radially at the inside in relation to the axis of rotation, and/or from a region, situated radially at the outside in relation to the axis of rotation, of the housing. In this way, it is firstly possible to achieve the advantage that, by means of the encapsulation of the side channels from one another, an exchange of the gaseous medium between the two side channels can take place only through the conveying cells of the compressor impeller, which, in the case of a conveying impeller which is in rotation, is possible only to a limited extent owing to the flow conditions. It can thereby be ensured that, in the two side channels, a mutually independent build-up of pressure and an independent circulating flow with the housing are generated, whereby a momentum exchange between channel flow and impeller flow in the two side channels is utilized. This offers the advantage that the efficiency and/or the conveying volume of the side-channel compressor can be increased, in particular in relation to side-channel compressors with only one side channel.

Furthermore, in this way, the advantage can be achieved that an encapsulation of the at least one side channel and/or of the conveying cell with respect to the region situated at the outside and/or the region situated at the inside in the housing is realized. This prevents either hydrogen and/or the heavy constituents from ingressing from the region of the compressor chamber into the region of the side-channel compressor in which components are situated that can be damaged by hydrogen and/or by the heavy constituents. Thus, for example, the service life of the bearings of a drive shaft can be increased, because damage as a result of corrosion, in particular as a result of contact with water, is prevented by the encapsulation of the region situated at the inside. Furthermore, an electrical short circuit as a result of an ingress of liquid into the electrical components is prevented, because all electrical components, such as for example a drive, are situated in the encapsulated region, situated at the inside, of the side-channel compressor, and are thus protected against liquid. Thus, the likelihood of failure of the side-channel compressor is reduced, and the service life of the fuel cell system can be increased.

In one advantageous refinement, the edges and the counterpart surface in the respective separation region run in encircling fashion around the axis of rotation. In this way, a low-friction and smooth rotation of the compressor impeller can be ensured, because there is a resulting possible guidance effect of the compressor impeller by means of the encircling edges during a rotation. Furthermore, the advantage can be achieved that the risk of misalignment and/or tilting of the compressor impeller is reduced. A further advantage of the edges running in encircling fashion around the axis of rotation and of the counterpart surface is that good encapsulation of the regions of the side channels and/or of the region situated at the inside and/or of the region situated at the outside from one another can be achieved. In this way, the service life of the side-channel compressor can be increased, whereas the likelihood of failure of the fuel cell system as a whole is reduced.

In one advantageous embodiment, the edges in the separation region are formed in encircling fashion around the axis of rotation in a first diameter region and/or in a second diameter region on the housing. Here, the tips of the edges are oriented axially with respect to the axis of rotation toward the counterpart surface on the compressor impeller, wherein the first diameter region delimits the side channels at their inner diameter radially with respect to the axis of rotation and the second diameter region delimits the side channels at their outer diameter radially with respect to the axis of rotation. In this way, it is possible in an inexpensive manner to realize a surface pairing according to the invention by means of which it is possible to prevent liquid water from being able to collect between the compressor impeller and the housing, in particular in the separation region, whereby it is ensured that no ice bridges form in the separation region in the presence of low temperatures. The realization is inexpensive because the encircling edges and/or encircling tips can be formed directly in the housing, such that said contour can be realized by machining of, in particular material removal from, the existing surface, which runs in a planar manner, in the housing. Here, the surface runs radially with respect to the axis of rotation, and machining is necessary only in the separation region. Furthermore, existing housings can be utilized, and only a machining step of material removal is necessary. This thus yields the advantage that the cold-start capability of the side-channel compressor can be improved, with only low additional manufacturing costs arising.

In a particularly advantageous refinement, the edges in the separation region are formed in encircling fashion around the axis of rotation in a third diameter region and/or in a fourth diameter region on the compressor impeller. Here, the tips of the edges are oriented axially with respect to the axis of rotation toward the counterpart surface in the housing, and the third diameter region delimits the conveying cell at its inner diameter radially with respect to the axis of rotation. Furthermore, the fourth diameter region delimits the conveying cell at its outer diameter radially with respect to the axis of rotation. In this way, it is possible in an inexpensive manner to realize a surface pairing according to the invention by means of which liquid water is prevented from collecting between the compressor impeller and the housing, in particular in the separation region, whereby it is ensured that no ice bridges form in the separation region in the presence of low temperatures. The realization is inexpensive because the encircling edges and/or encircling tips have to be applied to and/or formed into the compressor impeller only in the separation region and thus in the region of the third and fourth diameter region. The housing may remain unmachined in the region of the counterpart surface, or use may alternatively be made of an inexpensive method for improving the surface roughness. For the application and/or formation of the edges and/or tips to and/or on the compressor impeller, it is for example possible for the corresponding contour to be generated on the compressor impeller in one working step by means of the method of displacement rolling, without the need for material removal or an application of material. This offers the advantage that no modifications to the existing structural design of the compressor impeller are necessary. Furthermore, only one machining step is necessary, and an inexpensive realization of the particularly advantageous refinement of protection against freezing is thus possible. This yields the advantage that the cold-start capability of the side-channel compressor can be improved, with only low additional manufacturing costs.

In one advantageous embodiment, the edges in the separation region are formed in encircling fashion around the axis of rotation in the first diameter region and/or in the second diameter region on the housing. Here, the tips of the edges are oriented radially with respect to the axis of rotation toward the counterpart surface on the compressor impeller, and wherein the first diameter region extends radially with respect to the axis of rotation from the inner diameter of the conveying cell as far as the hub disk of the compressor impeller. Furthermore, the second diameter region extends radially with respect to the axis of rotation from the outer diameter of the conveying cell as far as the outer diameter of the encapsulated region situated at the outside in the housing. In this way, the advantage can be achieved that a compact construction can be realized despite the formation of the edges with the tips in the housing and in the separation region, while a reliable outflow of the liquid water, in particular radially with respect to the axis of rotation, prevents ice bridge formation. It is advantageous here that an improved cold-start capability and greater reliability of the side-channel compressor in the fuel cell system and/or in the vehicle can be ensured, while no additional structural space is required in the housing despite the advantageous function of protection of the compressor impeller against freezing.

In one advantageous refinement, the edges in the separation region are formed in encircling fashion around the axis of rotation in the third diameter region and/or in the fourth diameter region on the compressor impeller, wherein the tips of the edges are oriented radially with respect to the axis of rotation toward the counterpart surface on the housing. Here, the third diameter region delimits the conveying cell at its inner diameter radially with respect to the axis of rotation, and the fourth diameter region delimits the conveying cell at its outer diameter radially with respect to the axis of rotation. In this way, the advantage can be achieved that a compact design can be realized despite the formation of the edges with the tips on the compressor impeller in the separation region, while a reliable outflow of the liquid water, in particular radially with respect to the axis of rotation, prevents ice bridge formation. Furthermore, the application and/or formation of the edges and/or tips to and/or on the compressor impeller can take place in only one working step. Here, the inexpensive and fast method of rolling, in particular ring rolling and/or transverse rolling, can be used in order to generate the corresponding contour of the edges with the tips. The manufacturing costs for the side-channel compressor can thus be kept low, while the cold-start capability is improved, which leads to a longer service life of the side-channel compressor and of the fuel cell system even in the presence of low ambient temperatures and in the case of long periods in which the fuel cell system is in a shut-down state.

In a particularly advantageous embodiment, the compressor impeller has the encircling counterpart surface in the first diameter region and/or in the second diameter region, wherein the counterpart surface has, in the direction of the axis of rotation, a linear profile which is angled with respect to the axis of rotation and which is in particular of encircling conical form. Here, the profile of the counterpart surface runs in particular symmetrically away from an axis of symmetry in two directions of the axis of rotation, and here the tips of the edges on the housing are oriented orthogonally with respect to the counterpart surface toward the compressor impeller. Furthermore, here, the third diameter region delimits the conveying cell at its inner diameter radially with respect to the axis of rotation, and the fourth diameter region delimits the conveying cell at its outer diameter radially with respect to the axis of rotation. In a further exemplary embodiment, the housing has the encircling counterpart surface in the first diameter region and/or in the second diameter region, wherein the counterpart surface has, in the direction of the axis of rotation, at least one linear profile which is angled with respect to the axis of rotation and which is in particular of encircling conical form, and wherein the profile of the counterpart surface runs in particular symmetrically away from the axis of symmetry in two directions of the axis of rotation. Here, the tips of the edges on the compressor impeller are oriented orthogonally with respect to the counterpart surface toward the housing, and the first diameter region delimits the side channels at their inner diameter radially with respect to the axis of rotation. Furthermore, the second diameter region delimits the side channels at their outer diameter radially with respect to the axis of rotation. In this way, the advantage can be achieved that, owing to the encircling angled profile, an improved discharge of the liquid water from the separation region is possible. It is ensured here that, even in the case of a multiplicity of different installation positions of the side-channel compressor, at least one of the two angled profiles in the separation region permits an optimum discharge of the liquid water, because at least one separation region is oriented in an expedient manner with respect to the direction of action of gravitational force, whereby the discharge of the liquid water from the separation regions is further improved. A further advantage of the profile of the counterpart surface, and of the surface with the edges and tips, at an angle with respect to the axis of rotation is that, during a rotation of the compressor impeller, owing to the centrifugal force of the medium, in particular liquid water, an improved discharge from the separation region can be achieved. Upon a shut-down of the side-channel compressor, no liquid water, or only a small amount of liquid water, is situated in the separation region. This yields the advantage that the cold-start capability of the side-channel compressor can be improved, and the service life of the side-channel compressor can be improved.

In one advantageous embodiment, the housing has an interrupter region between the gas inlet opening and the gas outlet opening, wherein the interrupter region has multiple arcuate projections arranged in series. Here, the arcuate projections run in a stepped manner in a flow direction or in a stepped manner counter to the flow direction, wherein the ends of the projections in the direction of the axis of symmetry run from the center of the side channel toward the respective first or second diameter region in a leading or trailing manner in a flow direction. In this way, the advantage can be achieved that an effective separation gives rise to a separation of a pressure side, in particular in the region of the gas outlet opening, and a suction side, in particular in the region of the gas inlet opening. This separation is necessary in order to be able to ensure effective conveyance of the gaseous medium in the fuel cell system and prevent a backflow of and/or dissipation of pressure in the gaseous medium from the pressure side to the suction side across the separation region. By means of the multiple arcuate projections arranged in series in the interrupter region, it can be ensured that the pressure difference between the pressure side and the inlet side is dissipated progressively. It is furthermore advantageous here for the projections to run in a stepped manner, wherein the ends thereof run in a leading or trailing manner, whereby a uniform dissipation of the pressure difference occurs and no adverse effects can arise owing to flow separation. In this way, the pressure losses in the interrupter region can be reduced, and the efficiency of the side-channel compressor can be increased.

In one advantageous refinement, the housing has, in the second diameter region, a groove running in encircling fashion around the axis of rotation. In this way, the advantage can be achieved that the heavy constituents, which are in particular liquid water and/or water vapor and/or nitrogen, can be discharged from the region of the conveying cell and/or the side channels into the encircling groove. The discharge of the heavy constituent or of the heavy constituents takes place here by means of the centrifugal force that is exerted on the gaseous medium by the rotation of the compressor impeller. Here, the heavy constituents are moved from the region of the side channels and/or from the region of the conveying cell in a discharge direction away from the axis of rotation, or in the direction of the axis of rotation, through the separation region, in particular between the housing and compressor impeller, to the groove. In a further exemplary refinement of the invention, the groove has a discharge bore through which the heavy constituents can be discharged out of the housing. As a result, the heavy constituents are discharged out of the region of the at least one side channel and/or of the conveying cell.

BRIEF DESCRIPTION OF THE DRAWINGS

The invention will be described in more detail below on the basis of the drawing.

In the drawing.

DETAILED DESCRIPTION

Figure 1:
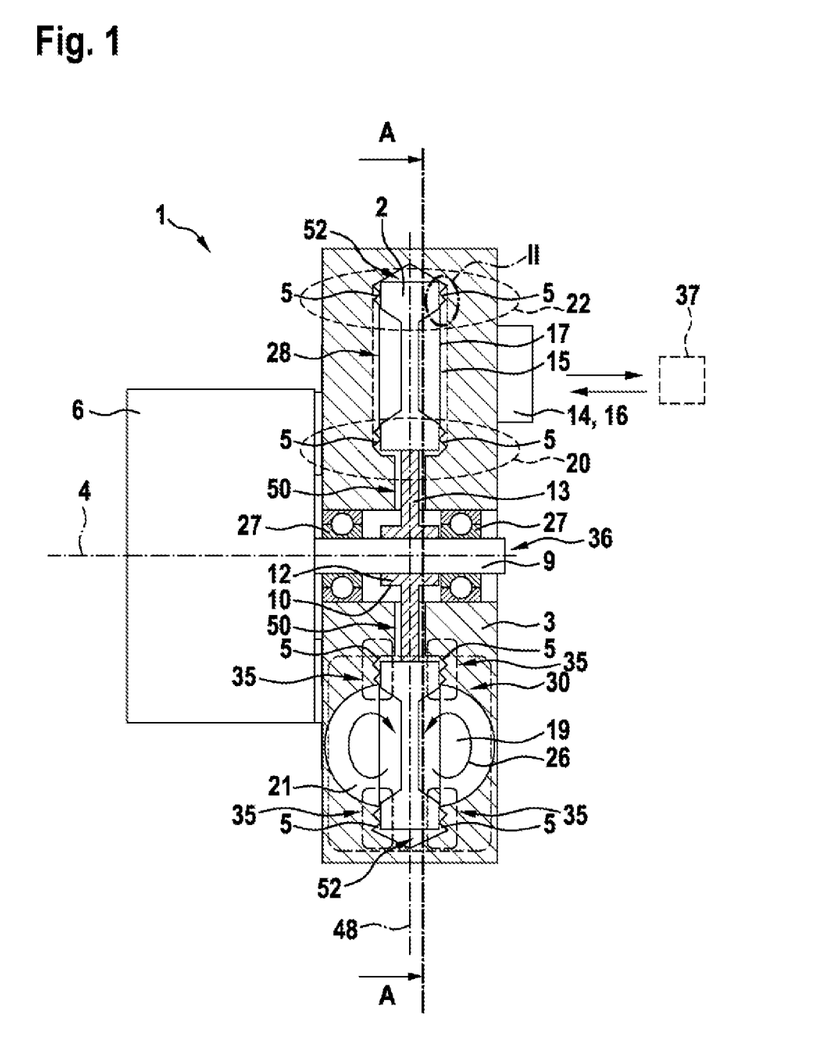
FIG. 1 shows a schematic sectional view of a side-channel compressor according to the invention.

The illustration as per FIG. 1 is a schematic sectional view of a side-channel compressor 1 according to the invention.

Here, the side-channel compressor 1 has a compressor impeller 2 which is mounted, rotatably about a horizontally running axis of rotation 4, in a housing 3. Here, a drive 6, in particular an electric drive 6, serves as rotary drive 6 of the compressor impeller 2. The compressor impeller 2 is arranged rotationally conjointly on a drive shaft 9 and is in particular connected to the drive shaft 9 by means of an interference fit. The compressor impeller 2 has an inner compressor impeller hub 10, wherein the compressor impeller hub 10 has an aperture through which the drive shaft 9 is inserted. The compressor impeller hub 10 is furthermore delimited in encircling fashion, on the side averted from the axis of rotation 4, by a hub base 12. From the hub base 12, in an outward direction away from the axis of rotation 4, the compressor impeller 2 forms an encircling circular hub disk 13, wherein the compressor impeller 2 furthermore forms a conveying cell 28 which adjoins the hub disk 13 at the outer side. Here, a multiplicity of conveying cells 28 runs in the compressor impeller 2 in encircling fashion around the axis of rotation 4 in an encircling compressor chamber 30 of the housing 3.

Furthermore, the housing 3 has, in the region of the compressor chamber 30, a first encircling side channel 19 and/or a second encircling side channel 21. Here, the side channels 19, 21 run in the housing 3 in the direction of the axis of rotation 4 such that they run axially to the conveying cell 28 on both sides. Here, the side channels 19, 21 may, at least in one subregion of the housing 3, run in encircling fashion around the axis of rotation 4, wherein, in the subregion in which the side channels 19, 21 are not formed in the housing 3, an interrupter region 15 is formed in the housing 3, wherein the interrupter region 15 has arcuate projections 17.

The drive shaft 9 is, by means of one end axially with respect to the axis of rotation 4, connected at least cardanically to the drive 6. Here, a bearing 27 is situated on the outer diameter of the drive shaft 9 axially in the region between the drive 6 and the compressor impeller 2, in particular between the drive 6 and the hub base 12 of the compressor impeller 2. The drive shaft 9 forms a bearing journal 36 axially with respect to the axis of rotation 4 on its side averted from the drive 6, wherein a further bearing 27 is situated in the region of the bearing journal 36. The bearings 27 may be rolling bearings 27, in particular ball bearings 27.

Furthermore, the housing 3 forms a gas inlet opening 14 and a gas outlet opening 16. Here, the gas inlet opening 14 and the gas outlet opening 16 are fluidically connected to one another, in particular via the at least one side channel 19, 21.

From the drive 6, a torque is transmitted via the compressor impeller hub 10 to the compressor impeller 2. Here, the compressor impeller 2 is set in rotational motion and the conveying cell 28 moves, in an encircling rotational movement around the axis of rotation 4, through the compressor chamber 30 in the housing 3 in the direction of a flow direction 47 (see FIG. 2). Here, a gaseous medium already situated in the compressor chamber 30 is moved concomitantly by the conveying cell 28 and, in the process, is conveyed and/or compressed. Furthermore, a movement of the gaseous medium, in particular a flow exchange, takes place between the conveying cell 28 and the at least one side channel 19, 21. Here, for the conveying action, it is crucial that, during operation, a circulation flow 26 can form within the respective side channel 19, 21. This is achieved by virtue of the side channels 19, 21 being pneumatically separated from one another by means of the surface pairings in a separation region 35. This is generally achieved by means of the smallest possible play between said surface pairings. Furthermore, the gaseous medium, which is in particular an unconsumed recirculation medium from a fuel cell 39, flows via the gas inlet opening 14 into the compressor chamber 30 of the side-channel compressor 1 and/or is fed to the side-channel compressor 1 and/or is drawn in from the region situated upstream of the gas inlet opening 14. Here, after having passed through the gas outlet opening 16 of the side-channel compressor 1, the gaseous medium is discharged and flows into a fuel cell system 37. Also shown is an axis of symmetry 48 which runs orthogonally with respect to the axis of rotation 4 and symmetrically centrally through the section geometry of the compressor impeller 2.

It is also shown in FIG. 1 that at least one edge 5 which encircles the axis of rotation 4 is arranged in the compressor chamber 30 of the housing 3, wherein the encircling edge 5 is arranged in particular in the separation region 35 between the housing 3 and the compressor impeller 2. Here, the separation region 35 is formed by a surface pairing of the components compressor impeller 2 and housing 3 such that the respective component has at least one encircling edge 5, in particular with in each case one encircling tip 11, and the respective other component has an encircling, at least approximately planar counterpart surface 23. By means of the separation region 35, an encapsulation of the conveying cell 28 and/or of the respective side channel 19, 21 from one another and/or of the respective side channel 19, 21 from a region 50, situated radially at the inside in relation to the axis of rotation 4, and/or from a region 52, situated radially at the outside in relation to the axis of rotation 4, of the housing 3 can be realized. In certain operating situations of the side-channel compressor 1, an at least partial and slight movement of the gaseous medium through from the side channel 19, 21 into the region 52 situated at the outside can take place at least intermittently. The edges 5 are in this case, in the separation region 35, formed in encircling fashion around the axis of rotation 4 in a first diameter region 20 and/or in a second diameter region 22 on the housing 3. Here, the tips 11 of the edges 5 are oriented axially with respect to the axis of rotation 4 toward the counterpart surface 23 on the compressor impeller 2, and the first diameter region 20 delimits the side channels 19, 21 at their inner diameter radially with respect to the axis of rotation 4 and the second diameter region 22 delimits the side channels 19, 21 at their outer diameter radially with respect to the axis of rotation 4. By means of the encapsulation, a situation is furthermore prevented in which the gaseous medium can ingress from the region of the conveying cell 28 and/or the side channels 19, 21 into the region 50, situated at the inside, and/or the region 52, situated at the outside, of the side-channel compressor 1. In this way, a situation is furthermore prevented in which the components drive 6 and/or bearings 27 and/or drive shaft 9, which are situated in the region 50 situated at the inside, are damaged. In the case of the electric drive 6, an ingress of the heavy constituent water, or of hydrogen, can lead to a short circuit and/or to damage to the electrical or magnetically soft components of the drive 6. This may restrict the operation of the side-channel compressor 1 as a whole, and even lead to a failure.

Figure 2:
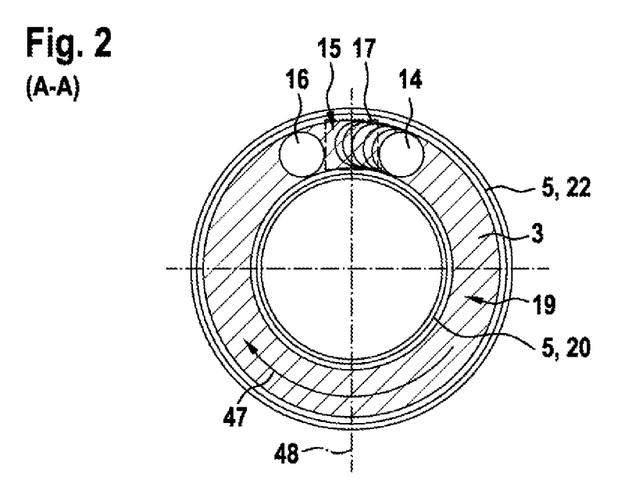
FIG. 2 shows a section, designated A-A in FIG. 1, of the side-channel compressor in an enlarged illustration.

FIG. 2 shows a section, designated A-A in FIG. 1, of the side-channel compressor 1 in an enlarged illustration, in which the housing 3, the gas inlet opening 14, the gas outlet opening 16, the axis of symmetry 48, the interrupter region 15, the side channel 19 and the flow direction 47 of the medium are illustrated.

As illustrated in FIG. 2, the interrupter region 15 is situated in encircling fashion around the axis of rotation 4 in the housing 3, in particular between the gas inlet opening 14 and the gas outlet opening 16. Here, the gaseous medium is conveyed by the compressor impeller 2, and/or flows, from the gas inlet opening 14 to the gas outlet opening 16, and in so doing, at least partially flows through the side channels 19, 21. Here, with progressive circulation from the gas inlet opening 14 to the gas outlet opening 16 in the flow direction 47, the compression and/or the pressure and/or the flow speed of the gaseous medium in the conveying cell 28, in particular in the conveying cell 28 of the compressor impeller 2 and in the side channels 19, 21, increase(s). The interrupter region 15 effects a separation between a pressure side and a suction side, wherein the suction side is situated in the region of the gas inlet opening 14 and the pressure side is situated in the region of the gas outlet opening 16. It is shown here that the interrupter region 15 has multiple arcuate projections 17 arranged in series between the gas inlet opening 14 and the gas outlet opening. The arcuate projections 17 may in this case run in a stepped manner in the flow direction 47 or in a stepped manner counter to the flow direction 47. Here, FIG. 2 illustrates a first embodiment, in the case of which the ends of the projections 17 in the direction of the axis of symmetry 48 run from the center of the side channel 19 toward the respective first or second diameter region 20, 22 in a leading manner in a flow direction 47. In a further embodiment, it is also possible that the projections 17 in the direction of the axis of symmetry 48 run from the center of the side channel 19 toward the respective first or second diameter region 20, 22 in a trailing manner in a flow direction 47. Such an arrangement and design of the projections 17 offers the advantage that an effective separation between the suction side and the pressure side by means of the interrupter region 15 can be realized. This separation is necessary in order that an effective conveyance of the gaseous medium in the fuel cell system 37 can be ensured and no backflow and/or pressure dissipation of the gaseous medium from the pressure side to the suction side takes place via the interrupter region 15. Here, the pressure is dissipated in stepped fashion across the arcuate projections 17 arranged in series in the interrupter region 15, such that the pressure difference between the pressure side and the inlet side is dissipated progressively. It is furthermore advantageous here for the arcuate projections 17 to run in a stepped manner, wherein the ends thereof run in a leading or trailing manner, whereby a uniform dissipation of the pressure difference occurs and no adverse effects can arise owing to flow separation. In this way, the pressure losses in the interrupter region 15 can be reduced, and the efficiency of the side-channel compressor 1 can be increased.

It is furthermore illustrated that the housing 3 has in each case at least one encircling edge 5 in the first diameter region 20 and in the second diameter region 22. As illustrated in FIG. 2, the first diameter region 20 in this case delimits the first side channel 19 and/or the second side channel 21 at the inner diameter, whereas the second diameter region 22 delimits the first side channel 19 and/or the second side channel 21 at the outer diameter.

Figure 3:
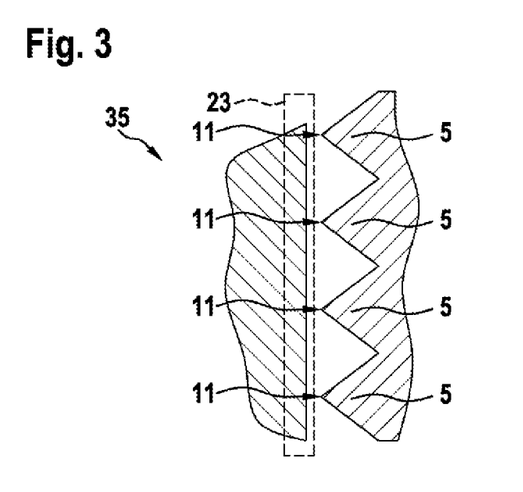
FIG. 3 shows a section, designated II in FIG. 1, of the side-channel compressor in an enlarged illustration.

FIG. 3 shows a section, designated II in FIG. 1, of the side-channel compressor 1 in an enlarged illustration. Here, the separation region 35 is shown, which is formed by a surface pairing of the components compressor impeller 2 and housing 3. Here, one of the two components forms the counterpart surface 23, whereas the respective other component forms the edges 5 encircling the axis of rotation 4, wherein the edges form, on the side facing toward the counterpart surface 23, the tips 11. The advantage of this design according to the invention of the separation region 35 is that, firstly, an accumulation of liquid water is prevented or at least impeded, in particular in relation to the separation region 35 with a surface pairing composed of at least two approximately planar counterpart surfaces 23. This is because, in the case of an accumulation in the separation region 35 between the edges 5 and the counterpart surface 23, the liquid water must form a large surface in order to fill the space between the edges 5 and the counterpart surface 23. This applies in particular in the case of a small spacing between the edges 5 and the counterpart surface 23, wherein a small spacing should be sought for the purposes of an encapsulating action, and, specifically in the case of the conveyance of hydrogen, the functionally relevant gaps between impeller and housing are dimensioned so as to be very small. Owing to the surface tension of liquid water, however, there is a constant physical endeavor to instead reduce the surface energy, that is to say saturate the open bonds on the molecular level over the entire surface of the liquid water. Here, the liquid water seeks to assume a state with the smallest possible surface area. For a water molecule, it is more expedient from an energy aspect to be situated in the interior of a water portion because, here, the attraction forces cancel one another out. A water portion will therefore always form the smallest possible surface area in order that the fewest possible water molecules have to be situated at the surface. This physical effect in the case of liquid water ensures that a direct flow-off from the separation region 35, in particular from the region between the edges 5 and the counterpart surface 23, takes place, because the surface of the liquid water that must be formed is in this case particularly large in order to fill the intermediate space. The force that arises is in this case as great as the surface tension of the water and the change in energy level between a large surface form of the liquid water in the separation region 35 in relation to an ideally formed droplet shape and/or spherical shape. This effect is particularly pronounced in the case of liquid water, in particular in relation to other liquids, because the magnitude of the surface tension is substantially dependent on the intensity of the attraction forces between the liquid molecules. Water has a very high surface tension owing to the high polarity of the water molecules and the resulting intense hydrogen bridge bonds. As a result, the surface between water and air acts in the manner of a tensioned elastic skin. Thus, an effective movement of the liquid water out of the separation region 35 can be effected even if no additionally assisting effects, such as for example a gravitational force effect and/or centrifugal force effect, act on the liquid water.

The arrangement of the edges 5 and of the counterpart surface 23 with respect to one another, and in particular with respect to the axis of rotation 4, will be illustrated in further exemplary embodiments in FIG. 4 to FIG. 7. Here, the invention is however not restricted to the exemplary embodiments described here and the aspects emphasized therein. Rather, numerous modifications that fall within the abilities of a person skilled in the art are possible within the scope stated in the claims.

Figure 4:
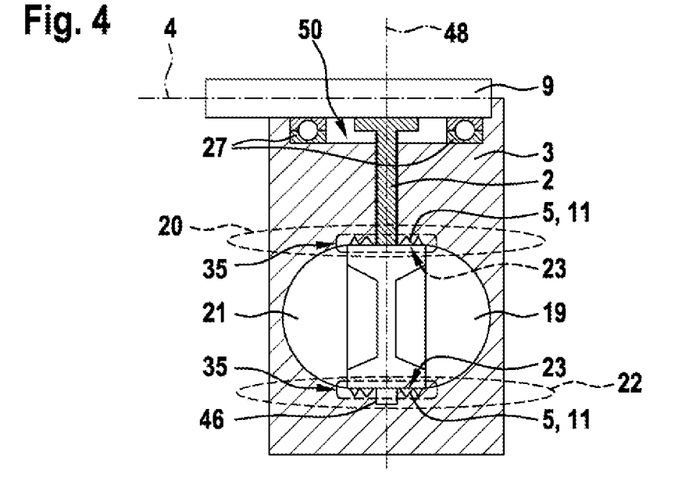
FIG. 4 shows a schematic sectional view of the side-channel compressor with a separation region according to a second exemplary embodiment of the invention.

FIG. 4 shows a schematic sectional view of the side-channel compressor 1 with the separation region 35 according to a second exemplary embodiment of the invention. It is shown here that the edges 5 in the separation region 35 are formed in encircling fashion around the axis of rotation 4 in the first diameter region 20 and/or in the second diameter region 22 on the housing 3, wherein the tips 11 of the edges 5 are oriented radially with respect to the axis of rotation 4 toward the counterpart surface 23 on the compressor impeller 2, and wherein the first diameter region 20 extends radially with respect to the axis of rotation 4 from the inner diameter of the conveying cell 28 to the hub disk 13 of the compressor impeller 2, whereas the second diameter region 22 extends radially with respect to the axis of rotation 4 from the outer diameter 22 of the conveying cell 28 as far as the outer diameter of the encapsulated region 52 situated at the outside in the housing 3. It is furthermore shown that the housing 3 has, in the second diameter region 22, a groove 46 running in encircling fashion around the axis of rotation 4. Here, the groove 46 may serve for collecting liquid water which cannot be discharged from the separation region 35 back into one of the side channels 19, 21 owing to the effect of the surface tension, for example owing to pressure or centrifugal forces. Thus, the liquid water cannot in this case be conducted out of the separation region 35 into the region of the groove 46, from where it is conducted in particular by means of an additional connecting channel into a region outside the side-channel compressor 1. In a further embodiment, the groove 46 may be utilized for collecting heavy constituents, in particular nitrogen, from the region of the side channels 19, 21. By means of a small spacing between the edges 5, which run in encircling fashion around the axis of rotation 4 and which have tips 11, and the counterpart surface 23, in particular in the first diameter region 20, a reliable encapsulation of the side channels 19, 21 from the region 50 situated at the inside is ensured. In a further embodiment which is not illustrated in FIG. 4, the side-channel compressor 1 may form the edges 5 on the compressor impeller 2, whereas the counterpart surface 23 is formed on the housing 3. Here, the edges 5 in the separation region 35 are formed in encircling fashion around the axis of rotation 4 in the first diameter region 20 and/or in the second diameter region 22 on the compressor impeller 2, wherein the tips 11 of the edges 5 are oriented radially with respect to the axis of rotation 4 toward the counterpart surface 23 on the housing 3, and wherein the first diameter region 20 delimits the conveying cell 28 at its inner diameter radially with respect to the axis of rotation 4, and the second diameter region 22 delimits the conveying cell 28 at its outer diameter radially with respect to the axis of rotation 4.

Figure 5:
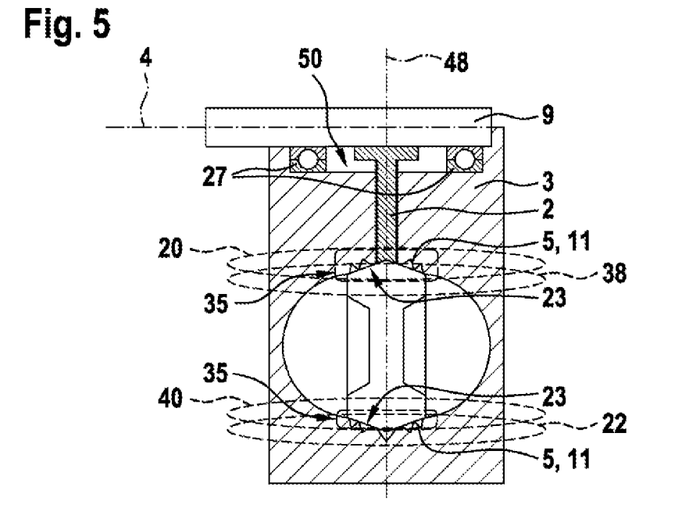
FIG. 5 shows a schematic sectional view of the side-channel compressor with the separation region according to a third exemplary embodiment of the invention.

FIG. 5 shows that the compressor impeller 2 has the encircling counterpart surface 23 in a third diameter region 38 and in a fourth diameter region 40, wherein the counterpart surface 23 has, in the direction of the axis of rotation 4, a linear profile which is angled with respect to the axis of rotation 4 and which is in particular of encircling conical form, wherein the profile of the counterpart surface 23 runs in particular symmetrically away from an axis of symmetry 48 in two directions of the axis of rotation 4, and wherein the tips 11 of the edges 5 on the housing 3 are oriented orthogonally with respect to the counterpart surface 23 toward the compressor impeller 2, and wherein the third diameter region 38 delimits the conveying cell 28 at its inner diameter radially with respect to the axis of rotation 4, and the fourth diameter region 40 delimits the conveying cell 28 at its outer diameter radially with respect to the axis of rotation 4. By means of this conical profile of the surface pairings of the side-channel compressor 1 with the encircling angled profile, a better discharge of the liquid water from the separation region 35 can be realized, because one of the two angled counterpart surfaces 23 permits an optimum discharge of the liquid water, because at least one of the two angled counterpart surfaces 23 is oriented in an expedient manner with respect to the direction of action of gravitational force. The liquid water can thus flow out of this functionally relevant region more easily, wherein, firstly, an outflow, in particular of the liquid water, in the third diameter region 38 from the separation region 35 to the respective side channel 19, 21 occurs owing to the centrifugal forces running radially away from the axis of rotation 4, in particular owing to the centrifugal forces exerted on the gaseous medium and/or liquid water by the rotational movement of the compressor impeller 2. An ingress of gaseous medium and/or liquid water into the region 50 situated at the inside is thus prevented. Secondly, in particular, an outflow, in particular of the liquid water, in the fourth diameter region 40 from the separation region 35 to the encircling groove 46 (not explicitly illustrated in FIG. 5) is ensured owing to the centrifugal forces running radially away from the axis of rotation 4, in particular owing to the centrifugal forces exerted on the gaseous medium and/or liquid water by the rotational movement of the compressor impeller 2. It is also possible for a suction action to be exerted on the liquid water in the separation region 35, in particular in the first diameter region 20, if the gaseous medium situated in the side channel 19, 21 flows away from the boundary region of the separation region 35 owing to the centrifugal forces and the liquid water is thus drawn out of the separation region 35 by suction.

Figure 6:
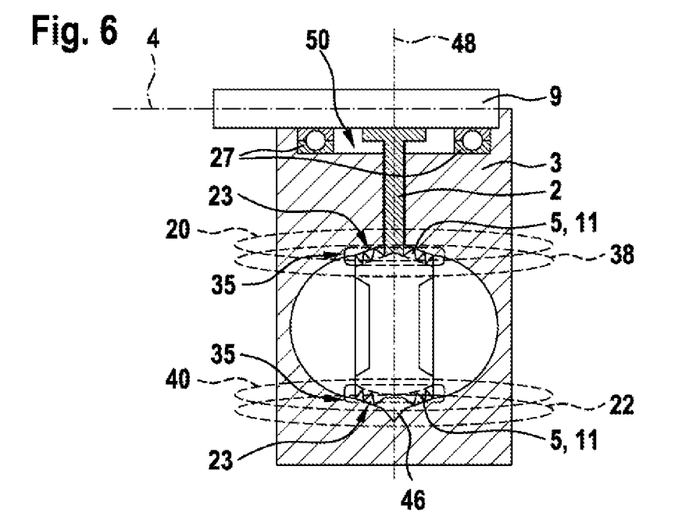
FIG. 6 shows a schematic sectional view of the side-channel compressor with the separation region according to a fourth exemplary embodiment of the invention.

It is illustrated in FIG. 6 that housing 3 has the encircling counterpart surface 23 in the first diameter region 20 and/or in the second diameter region 22, wherein the counterpart surface 23 has, in the direction of the axis of rotation 4, at least one linear profile which is angled with respect to the axis of rotation 4 and which is in particular of encircling conical form, wherein the profile of the counterpart surface 23 runs in particular symmetrically away from the axis of symmetry 48 in two directions of the axis of rotation 4, and wherein the tips 11 of the edges 5 on the compressor impeller 2 are oriented orthogonally with respect to the counterpart surface 23 toward the housing 3, and wherein the first diameter region 20 delimits the side channels 19, 21 at their inner diameter radially with respect to the axis of rotation 4, and the second diameter region 22 delimits the side channels 19, 21 at their outer diameter radially with respect to the axis of rotation 4. The profile of encircling conical form of the counterpart surface comprises the same advantages with regard to the outflow of the liquid water from the separation region 35 owing to the centrifugal forces, in particular from the region of the edges 5 and of the counterpart surface 23, that have already been described in FIG. 5.

Figure 7:
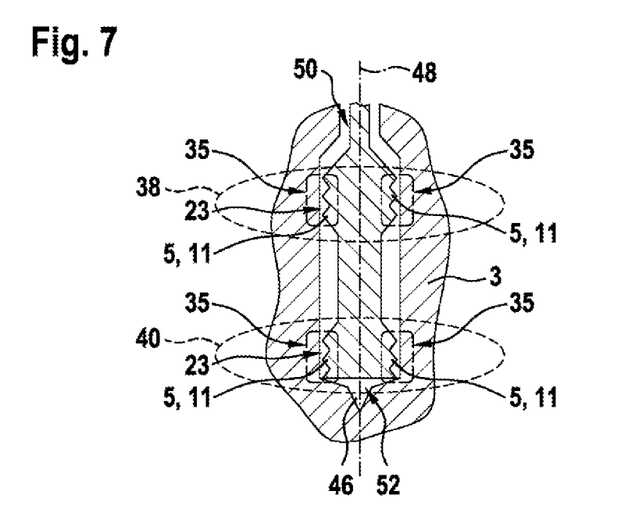
FIG. 7 shows a schematic sectional view of the side-channel compressor with the separation region according to a fifth exemplary embodiment of the invention.

It is shown in FIG. 7 that the edges 5 in the separation region 35 are formed in encircling fashion around the axis of rotation 4 in the third diameter region 38 and/or in the fourth diameter region 40 on the compressor impeller 2, wherein the tips 11 of the edges 5 are oriented axially with respect to the axis of rotation 4 toward the counterpart surface 23 in the housing 3, and wherein the third diameter region 38 delimits the conveying cell 28 at its inner diameter radially with respect to the axis of rotation 4 and the fourth diameter region 40 delimits the conveying cell 28 at its outer diameter radially with respect to the axis of rotation 4. The exemplary embodiment of the arrangement of the edges 5 and of the counterpart surface 23 with respect to one another as described in FIG. 7 is similar to the exemplary embodiment described in FIG. 1, wherein, in FIG. 7, the edges 5 are arranged on the compressor impeller 2 and the counterpart surface 23 is arranged on the housing, wherein this exemplary embodiment offers the same advantages as described in the exemplary embodiment of FIG. 1.

The invention claimed is:

1. A side-channel compressor (1) for a fuel cell system (37) for conveying and/or compressing a gaseous medium, the compressor comprising
a housing (3), having a compressor chamber (30) which is situated in the housing (3) and which has at least one encircling side channel (19, 21), having
a compressor impeller (2) which is situated in the housing (3) and which is arranged so as to be rotatable about an axis of rotation (4), wherein the compressor impeller (2) has conveying cells (28) arranged at its circumference in the region of the compressor chamber (30), and having
at least one gas inlet opening (14) formed on the housing (3) and one gas outlet opening (16) formed on the housing (3), which openings are fluidically connected to one another via the compressor chamber (30) and two side channels (19, 21), and
wherein, in a region of the compressor chamber (30), an encapsulation of a respective side channel (19, 21) is realized by at least one separation region (35) by a surface pairing of the compressor impeller (2) and of the housing (3),
wherein the at least one separation region (35) is formed by a surface pairing of the compressor impeller (2) and the housing (3) in such a way that, in each case, one of the impeller and the housing has encircling edges (5) with encircling tips (11), and an other of the impeller and the housing has an encircling, at least approximately planar counterpart surface (23), and
wherein the housing (3) has an interrupter region (15) between the gas inlet opening (14) and the gas outlet opening (16), wherein the interrupter region (15) has multiple arcuate projections (17) arranged in series, the arcuate projections (17) being separate from and between the gas inlet opening (14) and the gas outlet opening (16).

2. The side-channel compressor (1) as claimed in claim 1, characterized in that the at least one separation region (35) encapsulates the side channels (19, 21) from one another and/or encapsulates the respective side channel (19, 21) from a region (50), situated radially at the inside in relation to the axis of rotation (4), and/or from a region (52), situated radially at the outside in relation to the axis of rotation (4), of the housing (3).

3. The side-channel compressor (1) as claimed in claim 1, characterized in that the edges (5) and the counterpart surface (23) in a respective separation region (35) run in encircling fashion around the axis of rotation (4).

4. The side-channel compressor (1) as claimed in claim 1, characterized in that the edges (5) in the separation region (35) are formed in encircling fashion around the axis of rotation (4) in a first diameter region (20) and/or in a second diameter region (22) on the housing (3), wherein the tips (11) of the edges (5) are oriented axially with respect to the axis of rotation (4) toward the counterpart surface (23) on the compressor impeller (2), and wherein the first diameter region (20) delimits the side channels (19, 21) at their inner diameter radially with respect to the axis of rotation (4) and the second diameter region (22) delimits the side channels (19, 21) at their outer diameter radially with respect to the axis of rotation (4).

5. The side-channel compressor (1) as claimed in claim 1, characterized in that the edges (5) in the separation region (35) are formed in encircling fashion around the axis of rotation (4) in a third diameter region (38) and/or in a fourth diameter region (40) on the compressor impeller (2), wherein the tips (11) of the edges (5) are oriented axially with respect to the axis of rotation (4) toward the counterpart surface (23) in the housing (3), and wherein the third diameter region (38) delimits the conveying cell (28) at its inner diameter radially with respect to the axis of rotation (4) and the fourth diameter region (40) delimits the conveying cell (28) at its outer diameter radially with respect to the axis of rotation (4).

6. The side-channel compressor (1) as claimed in claim 1, characterized in that the edges (5) in the separation region (35) are formed in encircling fashion around the axis of rotation (4) in a first diameter region (20) and/or in a second diameter region (22) on the housing (3), wherein the tips (11) of the edges (5) are oriented radially with respect to the axis of rotation (4) toward the counterpart surface (23) on the compressor impeller (2), and wherein the first diameter region (20) extends radially with respect to the axis of rotation (4) from the inner diameter of the conveying cell (28) as far as a hub disk (13) of the compressor impeller (2), whereas the second diameter region (22) extends radially with respect to the axis of rotation (4) from the outer diameter (22) of the conveying cell (28) as far as the outer diameter of the encapsulated region (52) situated at the outside in the housing (3).

7. The side-channel compressor (1) as claimed in claim 1, characterized in that the edges (5) in the separation region (35) are formed in encircling fashion around the axis of rotation (4) in a first diameter region (20) and/or in a second diameter region (22) on the compressor impeller (2), wherein the tips (11) of the edges (5) are oriented radially with respect to the axis of rotation (4) toward the counterpart surface (23) on the housing (3), and wherein the first diameter region (20) delimits the conveying cell (28) at its inner diameter radially with respect to the axis of rotation (4) and the second diameter region (22) delimits the conveying cell (28) at its outer diameter radially with respect to the axis of rotation (4).

8. The side-channel compressor (1) as claimed in claim 1, characterized in that the compressor impeller (2) has the encircling counterpart surface (23) in a third diameter region (38) and/or in a fourth diameter region (40), wherein the counterpart surface (23) has, in the direction of the axis of rotation (4), a linear profile which is angled with respect to the axis of rotation (4), wherein the profile of the counterpart surface (23) runs away from an axis of symmetry (48) in two directions of the axis of rotation (4), and wherein the tips (11) of the edges (5) on the housing (3) are oriented orthogonally with respect to the counterpart surface (23) toward the compressor impeller (2), and wherein the third diameter region (38) delimits the conveying cell (28) at its inner diameter radially with respect to the axis of rotation (4), and the fourth diameter region (40) delimits the conveying cell (28) at its outer diameter radially with respect to the axis of rotation (4).

9. The side-channel compressor (1) as claimed in claim 1, characterized in that the housing (3) has the encircling counterpart surface (23) in a first diameter region (20) and/or in a second diameter region (22), wherein the counterpart surface (23) has, in the direction of the axis of rotation (4), at least one linear profile which is angled with respect to the axis of rotation (4) and which is in particular of encircling conical form, wherein the profile of the counterpart surface (23) runs in particular symmetrically away from an axis of symmetry (48) in two directions of the axis of rotation (4), and wherein the tips (11) of the edges (5) on the compressor impeller (2) are oriented orthogonally with respect to the counterpart surface (23) toward the housing (3), and wherein the first diameter region (20) delimits the side channels (19, 21) at their inner diameter radially with respect to the axis of rotation (4), and the second diameter region (22) delimits the side channels (19, 21) at their outer diameter radially with respect to the axis of rotation (4).

10. The side-channel compressor (1) as claimed in claim 1, characterized in that the arcuate projections (17) run in a stepped manner in a flow direction (47) or in a stepped manner counter to the flow direction (47), wherein ends of the projections (17) in the direction of an axis of symmetry (48) run from the center of the side channel (19) toward a respective first or second diameter region (20, 22) of the housing (3) in a leading or trailing manner in a flow direction (47).

11. The side-channel compressor (1) as claimed in claim 4, characterized in that the housing (3) has, in the second diameter region (22), a groove (46) running in encircling fashion around the axis of rotation (4).

12. The side-channel compressor (1) as claimed in claim 1, characterized in that the compressor impeller (2) has the encircling counterpart surface (23) in a third diameter region (38) and/or in a fourth diameter region (40), wherein the counterpart surface (23) has, in the direction of the axis of rotation (4), a linear profile which is angled with respect to the axis of rotation (4) and which is of encircling conical form, wherein the profile of the counterpart surface (23) runs symmetrically away from an axis of symmetry (48) in two directions of the axis of rotation (4), and wherein the tips (11) of the edges (5) on the housing (3) are oriented orthogonally with respect to the counterpart surface (23) toward the compressor impeller (2), and wherein the third diameter region (38) delimits the conveying cell (28) at its inner diameter radially with respect to the axis of rotation (4), and the fourth diameter region (40) delimits the conveying cell (28) at its outer diameter radially with respect to the axis of rotation (4).

13. The side-channel compressor (1) as claimed in claim 1, wherein the projections (17) are all curved in the same direction.

* * * * *